Patented Aug. 31, 1948

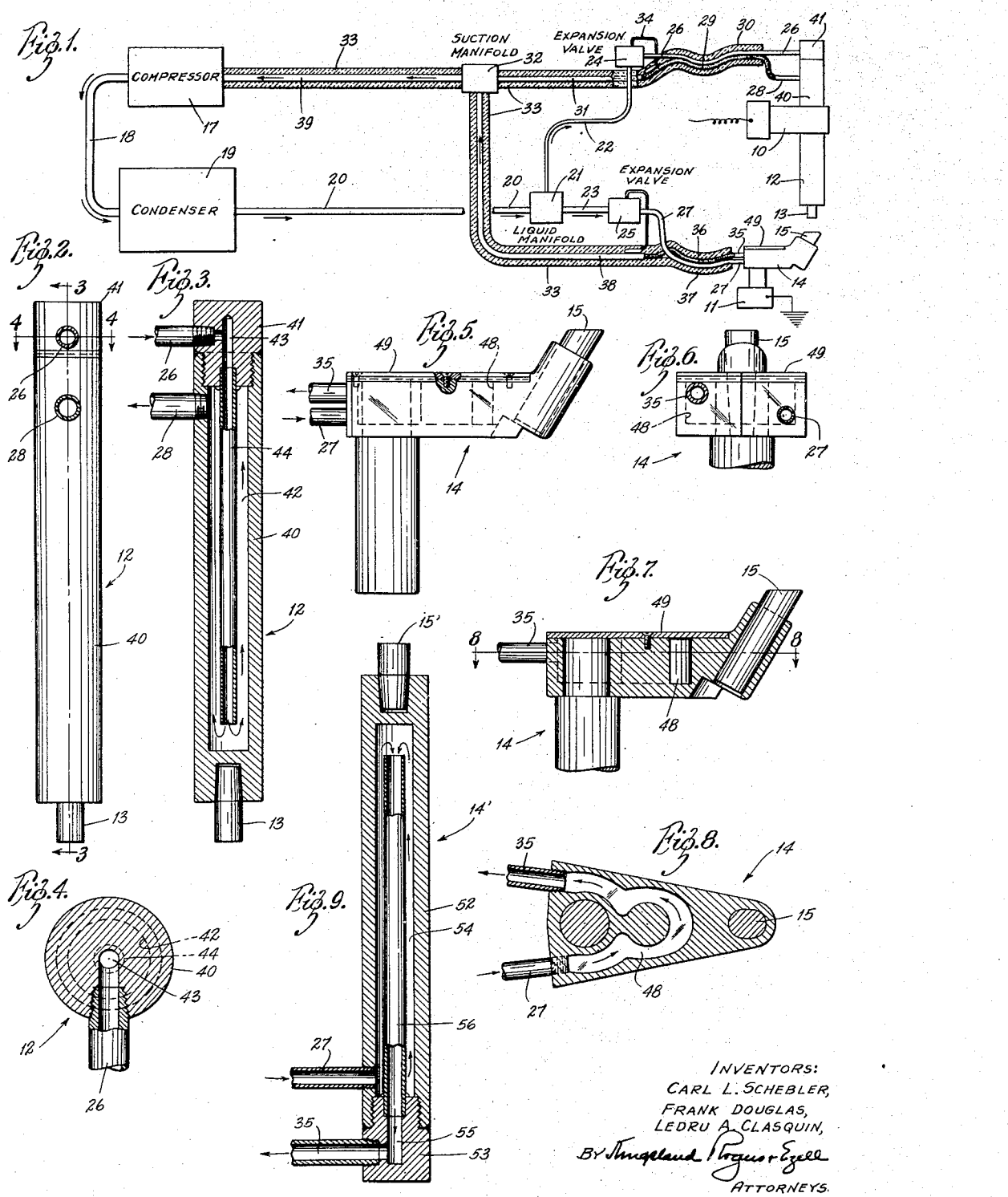

2,448,396

UNITED STATES PATENT OFFICE 2,448,396

REFRIGERATED ELECTRODE

Carl L. Schebler, St. Louis, Frank Douglas, Brentwood, and Ledru A. Clasquin, Riverview Gardens, Mo., assignors to The Emerson Electric Mfg. Co., St. Louis, Mo., a corporation of Missouri Application December 2, 1943, Serial No. 512,540

4 Claims. (Cl. 219—4)

The present invention relates to a refrigerated electrode. It includes a system by which an electrode, such as is used in resistance welding, may be cooled, along with a construction of the electrode for use in the system.

It is an object of the invention to provide a system and an electrode holding means whereby the electrode holding means constitutes the evaporator in the refrigeration system, whereby the excess heat of the electrode may be most efficiently dissipated and the life of the electrodes greatly increased.

More particularly, an object of the invention is to provide a system embodying two resistance electrodes, each having an evaporating means built into the electrode holders, with the evaporating means connected in parallel in a refrigerating system.

A particular object is to provide electrode holders designed to operate as evaporators. An especial object is to provide such electrode holders that will operate as evaporators in a flooded system. A further object is to provide such electrode holders for both the depending and upstanding electrode.

In the drawings:

Fig. 1 is a diagrammatic view of the system here contemplated;

Fig. 2 is a side elevation of the upper electrode holder;

Fig. 3 is a vertical medial section taken on the line 3—3 of Fig. 2;

Fig. 4 is a transverse section of the upper electrode holder taken on the line 4—4 toward the top of Fig. 2;

Fig. 5 is a side elevation, partly broken away, of the lower electrode holder;

Fig. 6 is a rear elevation of the lower electrode holder taken from the left of Fig. 5;

Fig. 7 is a medial longitudinal section of the lower electrode holder;

Fig. 8 is a horizontal section through the lower electrode holder taken on the line 8—8 of Fig. 7; and Fig. 9 is a longitudinal medial section of a vertical lower electrode holder.

In Fig. 1, two clamping means 10 and 11 are shown, they being parts of a resistance welding machine. They are movable, one toward the other, for adjustment and for bringing the electrodes into contact with the material to be welded. Conventionally, one of them is connected to a power line, and the other is connected to a ground.

The clamping member 10 holds an electrode holder 12 having a tip 13. The clamping member 11 holds an electrode holder 14 having a tip 15.

As will later appear in greater detail, the electrode holders 12 and 14 comprise members to receive a refrigerant in the unexpanded state to expand the same and pass the same off in a gaseous state as parts of a refrigerating system.

As shown in Fig. 1, this system includes a compressor 17 compressing the refrigerant and forcing it in compressed (usually liquid) form via a line 18 to the condenser 19, whence it flows through a line 20 to a liquid manifold 21, and from the manifold it flows through two liquid lines 22 and 23 into expansion valves 24 and 25, respectively. These parts are conventional, and are merely diagrammatically represented.

The expansion valves are similar. A liquid line 26 leads from the expanson valve 24 into the elec- trode holder 12. This line is flexible to permit movement and adjustment of the electrode holder. A liquid line 27 leads from the expansion valve 25 into the electrode holder 14, and is correspondingly flexible.

A suction line 28 comes from the electrode holder 12 and has a section 29 that is flexible and made of electrically insulating material, preferably rubber. Its flexibility permits the movement of the electrode holder to and from the work, and its being made of insulating material acts to prevent the passage of harmful current from the electrode holder 12, via other parts of the refrigeration system, to the ground. The flexible portion 29 of the suction line is contained within thermal insulation 30 that also encloses a corresponding portion of the liquid line 26. The electrically insulating flexible section 29 of the suction line is attached to a line 31 that leads to a suction manifold 32, and is covered by thermal insulation 33.

The expansion valve 24 has a thermostat capillary line 34 that leads to a bulb embedded within the insulation 33 to be responsive to the temperatures of the suction line of the electrode holder 12. This bulb controls the opening of the expansion valve in accordance with a demand for refrigeration in the holder 12.

The electrode holder 14 has a similar suction line 35, preferably with a flexible electrically insulating section 36, bound together with a corresponding section of the liquid line 27 in common thermal insulation 37, similarly to corresponding parts of the upper electrode. The section 36 of the suction line is connected to a line 38 that leads to the suction manifold 32. The line 38 is covered by heat insulation 33 similarly to the line 31.

The suction manifold 32 unites the two suction lines 31 and 38, and provides a common suction line 39, also thermally insulated as at 33, leading into the compressor 17.

The upper electrode holder 12 (Figs. 2–4) comprises an outer hollow cylindrical portion 40, closed at the bottom, and into which the contact tip 13 is fitted. A plug or cap 41 closes the upper end of the cylindrical portion 40 to provide an enclosed evaporating chamber 42. The liquid line 26 is attached to the cap 41 and, by a passage 43 therein, communicates with a tube 44 that leads almost to the bottom of the chamber 42. Adjacent the upper part of the chamber 42, the suction line 28 is connected.

The lower electrode holder 14 (Figs. 5–8) has within it a cut-out space 48, enclosed at the top by a cover plate 49. The space 48 provides an evaporating chamber extending around the holder 14, to provide a substantial heat absorbing area for the refrigerant. The liquid line 27 is connected into one end of the space 48 adjacent the bottom thereof. The suction line 35 is connected into the other end of the space 48 adjacent the top thereof.

Where it is desired to use a vertical lower electrode, that shown at 14' in Fig. 9 may be employed. It includes an outer cylindrical member 52, closed at the top, and supporting an electrode 15'. The cylindrical member 52 is closed in its bottom part by a plug 53, to form an evaporating chamber 54. The suction line 35 is connected into the chamber 54 through a passage 55 in the plug 53, and a tube 56 that extends almost to the top of the expansion chamber 54. The liquid line 27 is introduced at the bottom of the member 52.

*Operation*

A large amount of heat is generated at the electrode tips of a spot welding machine. This heat in the present apparatus flows into the electrode holders 12, and 14 or 14', raising the temperature thereof.

The apparatus delivers the refrigerant in liquid form into the electrode holders. As to the holder 12, the liquid flows through the tube passage 43 and the tube 44 until it establishes a level within the evaporating chamber 42. The heat from the tip causes the liquid to boil within the chamber 42. In boiling, it absorbs heat from the electrode holder itself (and consequently from the tip) to cool the same. Thereupon, it flows back through the suction line 28, the flexible line 29, connecting through line 31 to the suction manifold 32, and, finally, through the line 39, back to the compressor 17 for recycling.

In like manner, the refrigerant liquid flows through the liquid line 27 to the holder 14, where it establishes the desired liquid level in the bottom of the chamber 48 below the suction line 35. The heat from the tip 15 causes the liquid to boil within the chamber 48; and, in doing this, it absorbs heat from the electrode holder and the tip. The gasified refrigerant then passes back through the suction line 35, the flexible line 36, the line 38, to the suction manifold 32, and, finally, back to the compressor 17.

When the holder 14' is used, a liquid level is established within the evaporating chamber 54 of the member 52 at a suitable level, it being introduced thereinto by the liquid line 27. After it boils, extracting heat from the holder, it is drawn out through the tube 56 into the suction line 35.

It will be seen that the electrode holders themselves are formed as the evaporators of a refrigerating system. This markedly increases efficiency of heat dissipation. Heretofore, it has been attempted to cool the electrodes by circulating brine, but this has the disadvantages of inefficiency of heat transfer, and the fact that there is a considerable delay after starting the compressor before the brine is cooled to a temperature at which it may operate to cool the electrodes. The present system will work immediately after the compressor is started. Preferably, as shown, the cold refrigerant is introduced into the holders at a point remote from the tips, to prevent premature evaporation and heating of the liquid lines 26 and 27.

The invention is capable of use with other kinds of refrigerating systems, and is not limited to the flooded or semi-flooded systems. However, these systems have particular advantages in this connection, because in them the area of the evaporator may be small.

What is claimed is:

1. In a method of controlling the temperature of electrodes, or the like, the steps of providing an expansion chamber in heat-transferring relationship with the electrode, introducing a refrigerant liquid into said chamber so that the same may absorb heat and evaporate in the chamber, withdrawing the evaporated refrigerant from the chamber for reconversion and recirculating, and so controlling the supply of liquid refrigerant to the chamber by the temperature of the evaporated refrigerant that a liquid level of refrigerant will be maintained in the chamber.

2. In a continuous refrigeration apparatus for electrodes, an electrode holder carrying electrode means, means providing a chamber adjacent the heat-generating parts of the electrode means, a source of liquid refrigerant under pressure, conduit means for conducting the refrigerant to the chamber, an expansion valve for causing the refrigerant to enter the chamber in the form of liquid and partially fill a portion thereof adjacent the electrode means to thereby absorb heat from the electrode means and evaporate within the chamber above the liquid, outlet conduit means for conducting the evaporated refrigerant from the chamber, and means to maintain a controlled supply of liquid refrigerant constantly in the chamber.

3. In a continuous refrigeration apparatus for electrodes, an electrode holder having an expansion chamber separate from and adjacent to the electrode means, a source of liquid refrigerant under pressure, conduit means for conducting the refrigerant to the chamber, an expansion valve in said conduit and positioned exteriorly of the holder, said expansion valve causing the refrigerant to enter the chamber in the form of liquid and partially fill a portion thereof adjacent the electrode means to thereby absorb heat from the electrode means and evaporate within the chamber above the liquid, outlet conduit means for conducting the evaporated refrigerant from the chamber, and means responsive to the temperature of the evaporated refrigerant for controlling the expansion valve so as to maintain a supply of liquid refrigerant constantly in the chamber.

4. In a continuous refrigeration apparatus for electrodes, an electrode holder having an expansion chamber adjacent the heat-generating parts of the electrode means, a source of liquid refrigerant under pressure, conduit means for conducting the refrigerant to the chamber, an expansion valve in said conduit means and positioned exterior of the holder, said expansion valve causing the refrigerant to enter the chamber in the form of a liquid in order that it may absorb heat from the electrode means and evaporate within the chamber above the liquid, outlet conduit means for conducting the evaporated refrigerant from the chamber, and means responsive to the temperature of the evaporated refrigerant in the outlet conduit adjacent the chamber for controlling the expansion valve to maintain a constant supply of liquid refrigerant in the chamber.

CARL L. SCHEBLER.
    FRANK DOUGLAS.
    LEDRU A. CLASQUIN.

REFERENCES CITED

The following references are of record in the file of this patent:

UNITED STATES PATENTS

| Number | Name | Date |
|---|---|---|
| Re. 13,530 | Warren | Feb. 11, 1913 |
| 1,063,097 | Winfield et al. | May 27, 1913 |
| 1,330,563 | Weed | Feb. 10, 1920 |
| 1,900,941 | Kuhlman | Mar. 14, 1933 |
| 1,954,426 | Platz | Apr. 10, 1934 |
| 1,971,695 | Ploeger | Aug. 28, 1934 |
| 2,249,937 | Bohn | July 22, 1941 |
| 2,286,980 | Schanz | June 16, 1942 |
| 2,355,145 | Carlson | Aug. 8, 1944 |

FOREIGN PATENTS

| Number | Country | Date |
|---|---|---|
| 544,322 | Great Britain | Apr. 8, 1942 |
| 763,838 | France | Feb. 19, 1934 |